US009148830B1

(12) United States Patent
Singh et al.

(10) Patent No.: US 9,148,830 B1
(45) Date of Patent: Sep. 29, 2015

(54) REVERSE LINK THROUGHPUT USING MULTIPLE INPUT MULTIPLE OUTPUT (MIMO) ACROSS MULTIPLE WIRELESS DEVICES

(75) Inventors: Jasinder Pal Singh, Olathe, KS (US); Sachin R. Vargantwar, Overland Park, KS (US); Maulik K. Shah, Overland Park, KS (US); Siddharth Oroskar, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1025 days.

(21) Appl. No.: 13/176,909

(22) Filed: Jul. 6, 2011

(51) Int. Cl.
*H04W 4/00* (2009.01)
*H04J 11/00* (2006.01)
*H04W 36/00* (2009.01)
*H04L 25/03* (2006.01)

(52) U.S. Cl.
CPC . *H04W 36/0066* (2013.01); *H04L 2025/03426* (2013.01)

(58) Field of Classification Search
CPC .................. H04W 36/0066; H04L 2025/03426
USPC ........ 370/329; 375/267; 455/13.1, 452.2, 436
See application file for complete search history.

(56) References Cited

U.S. PATENT DOCUMENTS

| 7,164,919 | B2 * | 1/2007 | Chen ........................... 455/452.2 |
| 8,346,162 | B1 * | 1/2013 | Jayasimha et al. ........... 455/13.1 |
| 2006/0153110 | A1 | 7/2006 | Morgan et al. |
| 2008/0227454 | A1 * | 9/2008 | Damnjanovic ................ 455/436 |
| 2010/0111214 | A1 * | 5/2010 | Chin et al. ..................... 375/267 |
| 2013/0329653 | A1 * | 12/2013 | Russell et al. ................. 370/329 |

* cited by examiner

*Primary Examiner* — Mark Rinehart
*Assistant Examiner* — Gbemileke Onamuti

(57) ABSTRACT

Embodiments disclosed herein provide systems and methods for improving reverse link throughput using Multiple Input Multiple Output (MIMO) across multiple wireless devices. In a particular embodiment, in response to receiving a user instruction to execute an application associated with a wireless protocol over a MIMO transmit antenna system, a method provides transferring a wireless probe signal to identify whether an external MIMO antenna element is available over another wireless protocol. The method further provides generating a signal with a Walsh code for the application and wirelessly transmitting the signal from an internal MIMO antenna element for receipt by a MIMO receive antenna system. The method further provides wirelessly transmitting the signal over the other wireless protocol, wherein a second wireless device including the external MIMO antenna element receives the signal and wirelessly transmits the signal from the external MIMO antenna element for receipt by the MIMO receive antenna system.

20 Claims, 6 Drawing Sheets

REVERSE LINK THROUGHPUT USING MULTIPLE INPUT MULTIPLE OUTPUT (MIMO) ACROSS MULTIPLE WIRELESS DEVICES

TECHNICAL BACKGROUND

Multiple Input Multiple Output (MIMO) wireless communication transmission schemes allow for greater data throughput on a single wireless channel. This greater throughput is accomplished using the multipath characteristics inherent in the transmission of wireless signals. These characteristics stem from the fact that a wireless signal transmitted from a single antenna element may bounce off of various objects before being received at a receiver antenna element. The receiver antenna element thereby receives what is essentially the same signal multiple times as the signals that have bounced off the various objects arrive at the antenna element. The receiver antenna element is able to process the received multipath signals to obtain the signal that was originally transmitted.

MIMO transmission schemes take advantage of this fact that a receiver can distinguish an originally transmitted signal from multipath signals in order to increase data throughput. To do this, MIMO schemes use multiple antenna elements to transmit communications over the same channel. Using multiple antenna elements allows a MIMO scheme to divide a communication signal into components for transmission over the multiple antenna elements rather than transmitting the communications over a single element. This effectively multiplies the throughput of the wireless channel by the number of antenna elements. When a MIMO receiver receives communications from each MIMO transmission antenna element, the MIMO receiver is able to distinguish the communications from each element in order to recompile the original communications that were split for MIMO transmission.

While many modern wireless communication devices, such as cellular phones, are capable of receiving MIMO communications, the devices are unable to transmit MIMO signals because the devices lack the multiple antenna elements necessary for transmitting MIMO communications. Specifically, the size and packaging requirements of the devices prevent the devices from having the necessary space for the placement of the multiple antenna elements. Therefore, many wireless devices on their own can receive but not transmit MIMO communications.

Overview

Embodiments disclosed herein provide systems and methods for improving reverse link throughput using Multiple Input Multiple Output (MIMO) across multiple wireless devices. In a particular embodiment, a method provides, in a first wireless communication device, receiving a user instruction to execute an application associated with a wireless protocol over a MIMO transmit antenna system, wherein the wireless protocol separates users on a wireless channel using Walsh codes. In response the user instruction, the method provides transferring a wireless probe signal to identify whether an external MIMO antenna element is available over another wireless protocol that does not interfere with the wireless protocol and receiving a wireless response signal indicating an availability of the external MIMO antenna element over the other wireless protocol. The method further provides generating a signal with a Walsh code for the application and wirelessly transmitting at least a first portion of the signal with the Walsh code from an internal MIMO antenna element for receipt by a MIMO receive antenna system. The method further provides wirelessly transmitting at least a second portion of the signal with the Walsh code over the other wireless protocol, wherein a second wireless communication device including the external MIMO antenna element receives at least the second portion of the signal with the Walsh code over the other wireless protocol and wirelessly transmits at least the second portion of the signal with the Walsh code from the external MIMO antenna element for receipt by the MIMO receive antenna system.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
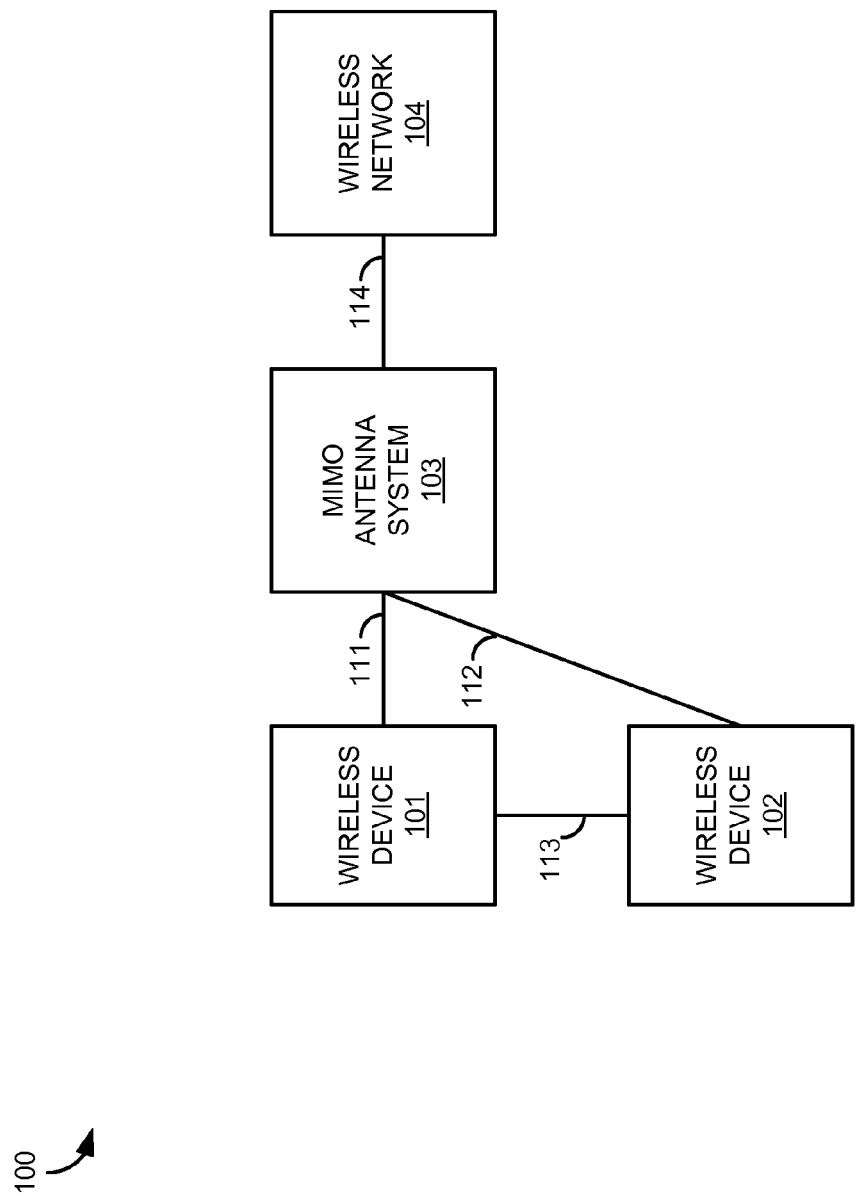
FIG. 1 illustrates a wireless communication system for improving reverse link throughput using Multiple Input Multiple Output (MIMO) across multiple wireless devices.

FIG. 1 illustrates wireless communication system 100 for improving reverse link throughput using Multiple Input Multiple Output (MIMO) across multiple wireless devices. Wireless communication system 100 includes wireless communication devices 101 and 102, MIMO antenna system 103, and wireless communication network 104. Wireless communication device 101 and MIMO antenna system 103 communicate over wireless link 111. Wireless communication device 102 and MIMO antenna system 103 communicate over wireless link 112. Wireless communication device 101 and wireless communication device 102 communicate over wireless link 113. MIMO antenna system 103 and wireless communication network 104 communicate over communication link 114.

In operation, MIMO antenna system 103 is capable of transmitting MIMO wireless communications using a protocol that supports MIMO transmission to wireless devices 101 and 102. A MIMO protocol allows multiple individual antenna elements to be used as a single MIMO antenna element to transfer wireless communications at a greater rate than could be transmitted using an individual element. A MIMO protocol is able to achieve greater transmission throughput by dividing communications into components among multiple individual antenna elements that make up a MIMO antenna element. This division among multiple antenna elements allows a MIMO antenna element to take advantage of the throughput capabilities of multiple individual antenna elements in order to effectively multiply the throughput capability of the MIMO antenna element as a whole.

During transmission, the components of a MIMO signal will mix together. Consequently, when a receiver, such as wireless device 101 or 102, receives the MIMO signal, the receiver must process the MIMO signal to separate the signal back into the components so that the transferred communications can be obtained. Depending on the type of MIMO protocol in use, a MIMO receiver may not require the same number of individual antenna elements as a MIMO transmitter in order to receive a MIMO signal. For example, MIMO antenna system 103 may include a MIMO antenna element made up of two individual antenna elements but receiving wireless devices 101 and 102 may each only have one individual antenna element for receiving MIMO signals.

While wireless devices 101 and 102 may be able to receive a MIMO signal from MIMO antenna system 103, wireless devices 101 and 102 individually may not be able to transmit a MIMO signal back to MIMO antenna system 103. In order for a MIMO transmission to work, individual antenna elements that make up a MIMO antenna element may require a certain physical spacing or orientation so that a MIMO signal transmitted from the MIMO antenna element can be processed correctly at a receiver. The size and packaging of many wireless devices, such as cell phones, tablets, laptops, or other mobile devices, does not allow for multiple antennas to be used in a MIMO configuration. Therefore, wireless devices 101 and 102 may not, individually, be able to transmit MIMO communications even though wireless devices 101 and 102 are capable of receiving MIMO communications.

Figure 2:
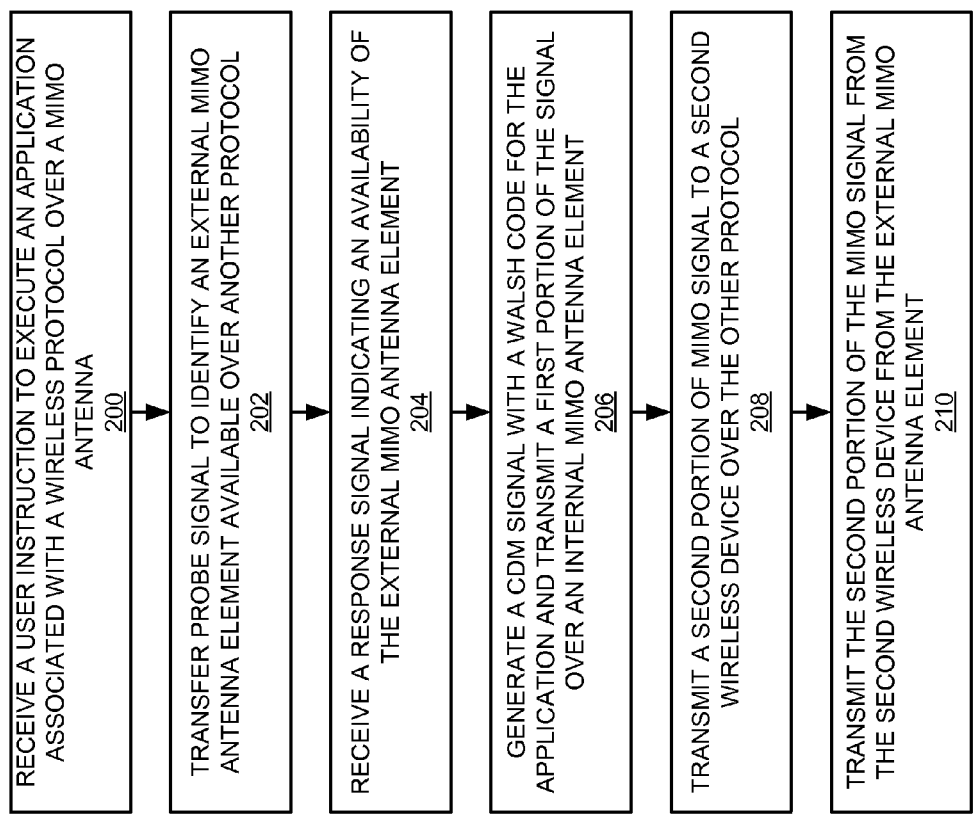
FIG. 2 illustrates the operation of the wireless communication system for improving reverse link throughput using MIMO across multiple wireless devices.

FIG. 2 illustrates the operation of wireless communication system 100 for improving reverse link throughput using MIMO across multiple wireless devices. Wireless device 101 receives a user instruction to execute an application associated with a wireless protocol over a MIMO transmit antenna system, wherein the wireless protocol separates users on a wireless channel using Walsh codes (step 200). The wireless protocol may be any type of wireless protocol that is capable of transferring MIMO wireless communications. Examples of MIMO communication protocols include Orthogonal Frequency Division Multiplexing (OFDM) protocols, such as Long Term Evolution (LTE) and Worldwide Interoperability for Microwave Access (WIMAX), or various forms of Wireless Fidelity (WIFI). Walsh codes are typically used for Code Division Multiplexing (CDM) on a wireless communication channel. CDM allows for multiple communication devices to use the same wireless communication channel by using separate Walsh codes to differentiate the signals transferred from each of the devices. However, a Walsh code may also be used for signal identification in situations other than CDM.

The application may be a streaming audio/video application, messaging application, web browser, or any other type of application that has a need to transmit data as part of the functionality of the application. Likewise, the application may be an application on wireless device 101 that acts as an intermediary to allow one of the before mentioned application types to transmit MIMO communications as described below. While the application is associated with a MIMO transmit antenna system, wireless device 101 itself does not have multiple antenna elements necessary for transmitting MIMO communications using the wireless protocol. In alternative embodiments, the wireless device 101 may have multiple antenna elements for transmitting MIMO communications using the wireless protocol but additional antenna elements would allow for faster MIMO communication throughput.

In response to the user instruction, wireless device 101 transfers a wireless probe signal to identify whether an external MIMO antenna element is available over another wireless protocol that does not interfere with the wireless protocol (step 202). The probe signal may be transferred using the wireless protocol, the other wireless protocol, or a third wireless protocol. For example, the wireless protocol may be LTE and the other wireless protocol may be WIFI or the wireless protocol may be WIFI and the other wireless protocol may be Bluetooth, among other protocols and combinations.

The probe signal may be transferred using the wireless protocol to wireless network 104, which determines whether the external MIMO antenna element is available. Alternatively, the probe may be transferred to other wireless devices through wireless network 104 or some other wireless network to query whether any of those other wireless device have an available external MIMO antenna element. Additionally, the probe signal may be transferred directly to other wireless devices without having to go through a wireless communication network.

After transferring the probe, wireless device 101 receives a wireless response signal indicating an availability of the external MIMO antenna element over the other wireless protocol (step 204). In this example the external MIMO antenna element is located in wireless device 102. The external MIMO antenna element includes one or more individual antenna elements that can be used to transmit communications using the MIMO capabilities of the wireless protocol. The wireless response signal may include various items of information necessary for wireless device 101 to connect to wireless device 102 over the other wireless protocol, such as a network address or pass codes.

The wireless response signal may be received from wireless device 102 over the other wireless protocol, over wireless network 104, or over another wireless network. The response signal may be transferred from wireless device 102 in acknowledgment of the probe signal or may be transferred by wireless network 104 upon a determination by wireless network 104 that wireless device 102 includes an available external MIMO antenna element.

Aside from having hardware components necessary for wireless device 102 to act as an external MIMO antenna element, wireless device 102 may need to execute software in order for the components of wireless device 102 to be available to wireless device 101 for use as an external MIMO antenna element. The software may be necessary in order to manage an antenna element of wireless device 102 to operate as an external MIMO antenna element for wireless device 101.

The software may process the probe signal transferred from wireless device 101 to determine whether wireless device 102 should respond to the probe signal to indicate that the components of wireless device 102 are available for use as an external MIMO antenna element. Likewise, if wireless network 104 determines an available external MIMO antenna element in response to the probe signal, then the software on wireless device 102 will instruct wireless device 102 to indicate to wireless network 104 whether the components of wireless device 102 are available as an external MIMO antenna element. In either of these cases, a user of wireless device 102 may need to indicate to the software whether the components of wireless device 102 should be used as an external MIMO antenna element. Moreover, the user may want to limit the devices that may use the components of wireless device 102 as an external MIMO antenna element so that unauthorized devices are unable to use the resources of wireless device 102.

Wireless device 101 then generates a signal with a Walsh code for the application and wirelessly transmits at least a first portion of the signal with the Walsh code from an internal MIMO antenna element for receipt by MIMO receive antenna system 103 (step 206). The signal with the Walsh code contains communications that the application is transferring to wireless network 104 via MIMO antenna system 103. The internal MIMO antenna element, like the external MIMO antenna element, includes one or more individual antenna elements that can be used to transmit communications using the MIMO capabilities of the wireless protocol.

The first portion of the signal with the Walsh code is transmitted over wireless link 111 to MIMO antenna system 103 and is only a component of the MIMO communications for the application. Depending on the MIMO transmittal scheme used by the wireless protocol, the signal with the Walsh code will be divided into two or more components depending on the number of individual antenna elements used for transmitting MIMO communications. For the MIMO communications to be complete, the external MIMO antenna element must also be used to transfer the rest of the signal with the Walsh code in order to complete the transmission of MIMO communications for the application.

Therefore, wireless device 101 wirelessly transmits at least a second portion of the signal with the Walsh code over the other wireless protocol, wherein wireless device 102 including the external MIMO antenna element receives at least the second portion of the signal with the Walsh code over the other wireless protocol and wirelessly transmits at least the second portion of the signal with the Walsh code from the external MIMO antenna element for receipt by MIMO receive antenna system 103 (step 208). Wireless device 102 receives at least the second portion of the signal with the Walsh code over wireless link 113 in the other wireless protocol. The second portion of the signal with the Walsh code may include only the portion of the signal that needs to be sent by the external MIMO antenna element. Alternatively, the second portion of the signal with the Walsh code may also include some or the entire first portion of the signal with the Walsh code. In that case, wireless device 102 may need to determine what constitutes the second portion of the signal with the Walsh code that the external MIMO antenna element should transmit to MIMO antenna system 103.

The communications that make up the second portion of the signal with the Walsh code may be spread with the Walsh code at wireless device 101 before being encapsulated within the other wireless protocol when transmitted over wireless link 113. This allows wireless device 102 to simply unpack the second portion before transmitting the second portion via the external MIMO antenna element. Alternatively, portion of the communications for the application that need to be transmitted from the external MIMO antenna element may be sent along with the information needed to modulate the second portion of the signal with the Walsh code into the wireless protocol at wireless device 102. Wireless device 102 itself thereby spreads the signal for transmission.

The result of the above steps allows the internal MIMO antenna element of wireless device 101 and the external MIMO antenna element of wireless device 102 to work as a single MIMO antenna with wireless links 111 and 112 working as a single MIMO link to transfer the communications for the application executing on wireless device 101. The fact that the signals that are transmitted from wireless devices 101 and 102 are transmitted with the same Walsh code allows for MIMO antenna system 103 to recognize the two signals as a single MIMO signal upon receipt. In other words, the signals transferred over wireless links 111 and 112 are spread with the Walsh code across the same wireless channel. Advantageously, the communications for the application are transmitted to MIMO antenna system 103 at a greater rate than would be attained by wireless device 101 itself.

In some embodiments, wireless device 101 may receive a feedback message indicating that transmission of the first portion of the signal with the Walsh code should be delayed for a period of time. This delay may be a very short period of time but may be necessary so that the first portion and the second portion of the signal with the Walsh code are received at MIMO antenna system 103 during a short enough time period for MIMO antenna system 103 to properly process the complete MIMO signal. The delay may be necessary due to the time that it takes to transfer the second portion of the signal with the Walsh code over the other protocol to wireless device 102. Wireless network 104 or some processing system in MIMO antenna system 103 may recognize the time offset between the two portions of the signal with the Walsh code in order to determine a delay and transfer a feedback message indicating the delay to wireless device 101. Similarly, wireless device 101 may include a built in delay that accounts for at least some time offset that would be caused by transferring the second portion of the signal with the Walsh code to wireless device 102.

In some embodiments, wireless device 101 may receive a feedback message that indicates that wireless device 101 or wireless device 102 should change positions. The change may be required in order for MIMO antenna system 103 to receive the signal with the Walsh code and properly process the signal. For example, in order for the signal with the Walsh code to be effectively processed, wireless device 101 and wireless device 101 may need to be a certain distance apart, may need to occupy a certain plane in space, or one device may need to be repositioned so that the internal and external antenna elements are oriented a certain way relative to each other (e.g. One element orthogonal to the other). Wireless network 104 or some processing system in MIMO antenna system 103 may be able to recognize that device positioning is causing difficulty in received MIMO signal processing and, thereby, may be able to determine a potential cause in order to provide a feedback message concerning the positioning of wireless devices 101 and 102. The feedback message may be in the form of a text message notifying the user of the feedback, may be provided through the application or some other application executing on wireless device 101, or by any other means of notifying a user of wireless devices 101 and 102 to adjust the positioning of the devices.

Referring back to FIG. 1, wireless communication devices 101 and 102 comprises Radio Frequency (RF) communication circuitry and at least one antenna. The RF communication circuitry typically includes an amplifier, filter, modulator, and signal processing circuitry. Wireless communication devices 101 and 102 may also include a user interface, memory device, software, processing circuitry, or some other communication components. Wireless communication devices 101 and 102 may each be a telephone, computer, e-book, mobile Internet appliance, wireless network interface card, media player, game console, or some other wireless communication apparatus—including combinations thereof.

MIMO antenna system 103 comprises RF communication circuitry and at least one antenna. The RF communication circuitry typically includes an amplifier, filter, RF modulator, and signal processing circuitry. MIMO antenna system 103 may also comprise a router, server, memory device, software, processing circuitry, cabling, power supply, network communication interface, structural support, or some other communication apparatus. MIMO antenna system 103 could be a base station, Internet access node, telephony service node, wireless data access point, or some other wireless communication system—including combinations thereof.

Wireless access network 104 comprises network elements that provide wireless devices with wireless communication access to communication services. Wireless network 104 may comprise switches, wireless access nodes, Internet routers, network gateways, application servers, computer systems, communication links, or some other type of communication equipment—including combinations thereof.

Wireless links 111-113 use the air or space as the transport media. Wireless links 111-112 may use various MIMO protocols, such as Worldwide Interoperability for Microwave Access (WIMAX) and Long Term Evolution (LTE) among others. Wireless link 113 may use various protocols, such as Code Division Multiple Access (CDMA), Evolution Data Only (EVDO), WIMAX, Global System for Mobile Communication (GSM), LTE, Wireless Fidelity (WIFI), High Speed Packet Access (HSPA), or some other wireless communication format. Communication link 114 uses metal, glass, air, space, or some other material as the transport media. Communication link 114 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication link 114 could be a direct link or may include intermediate networks, systems, or devices.

Figure 3:
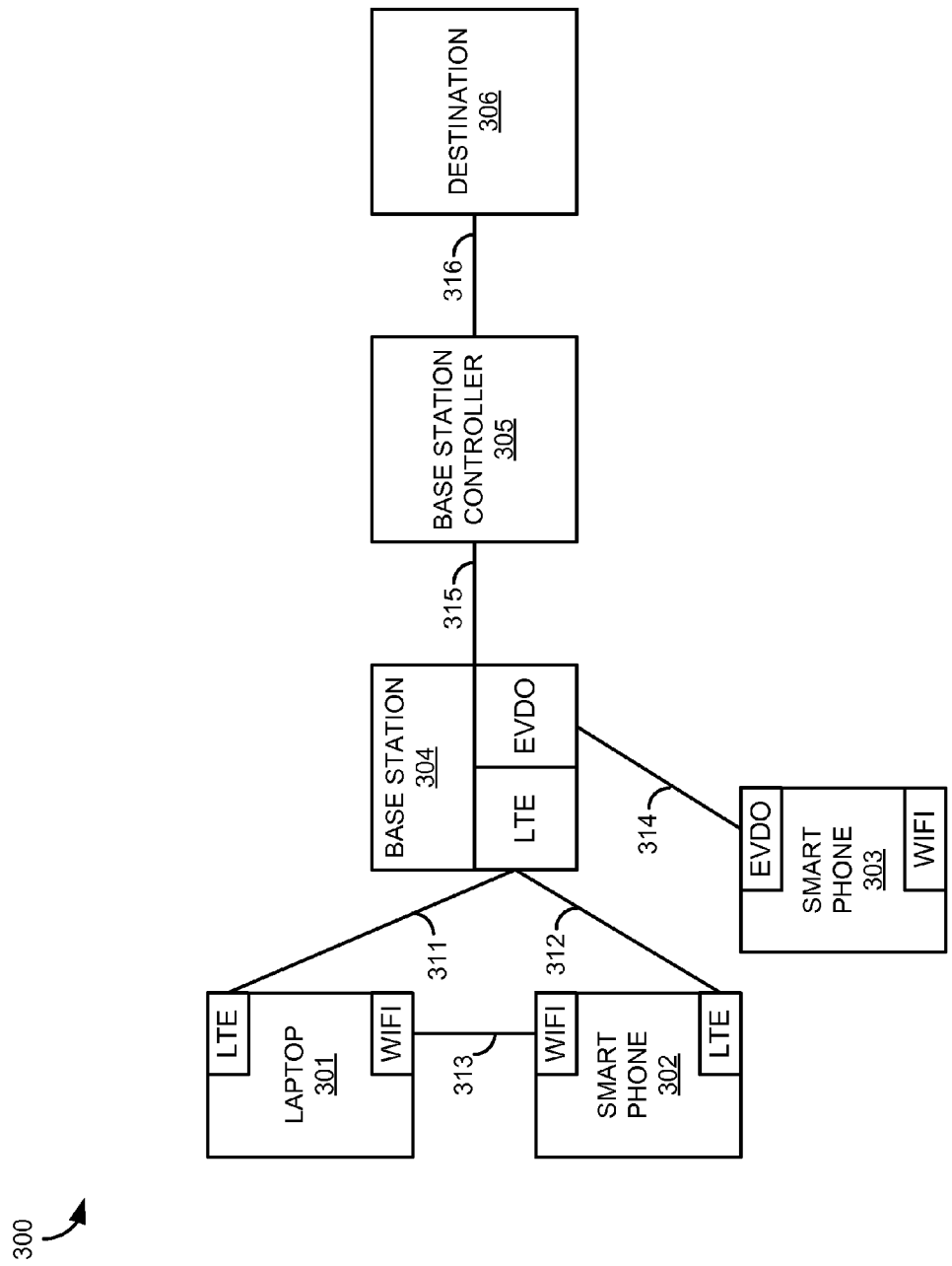
FIG. 3 illustrates a wireless communication system for improving reverse link throughput using MIMO across multiple wireless devices.

FIG. 3 illustrates wireless communication system 300 for improving reverse link throughput using Multiple Input Multiple Output (MIMO) across multiple wireless devices. Wireless communication system 300 includes laptop 301, smart phones 302 and 303, base station 304, base station controller (BSC) 305, and destination 306. Laptop 301 and base station 304 communicate over wireless link 311. Smart phone 302 and base station 304 communicate over wireless link 312. Laptop 301 and smart phone 302 communicate over wireless link 313. Smart phone 303 and base station 304 communicate over wireless link 314. Base station 304 and base station controller 305 communicate over communication link 315. Base station controller 305 and destination 306 communicate over communication link 316.

Figure 4:
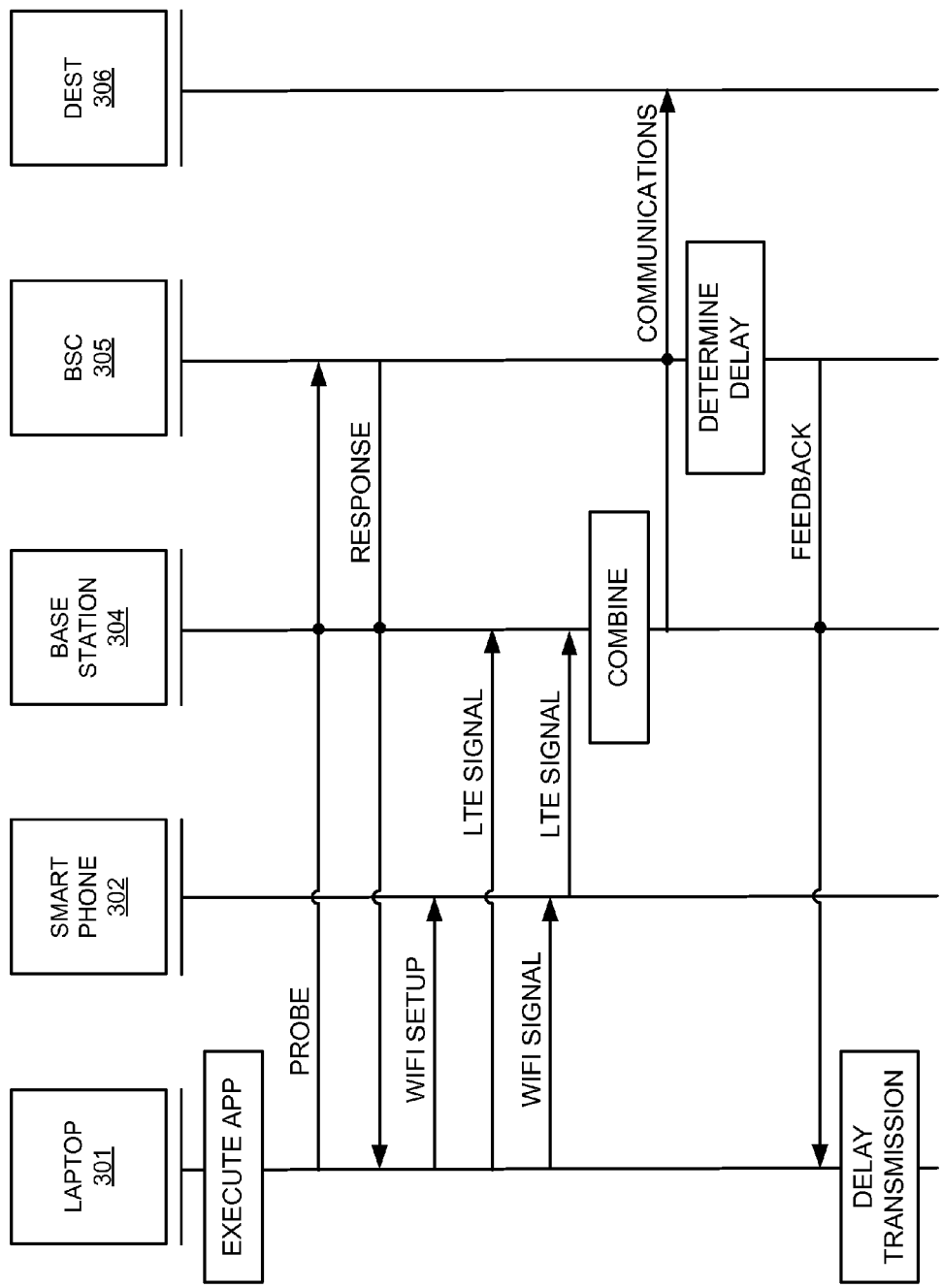
FIG. 4 illustrates the operation of the wireless communication system for improving reverse link throughput using MIMO across multiple wireless devices.

FIG. 4 is a sequence diagram illustrating the operation of wireless communication system 300 for improving reverse link throughput using Multiple Input Multiple Output (MIMO) across multiple wireless devices. The sequence begins when laptop 301 receives a user instruction to execute a video streaming application that is capable of transmitting MIMO communications over LTE. Transferring video streaming data from the application can be achieved using only the LTE antenna element of laptop 301 but using another antenna element to transmit MIMO LTE will allow the video streaming application more transmit bandwidth for streaming higher quality video.

In order to transmit MIMO communications, laptop 301 transmits a probe signal to BSC 305 via base station 304 and wireless link 311 using the LTE antenna element of laptop 301. BSC 305 determines that there are two other wireless devices within the area of laptop 301. Of those devices, smart phones 302 and 303, BSC 305 determines that smart phone 302 is available for laptop 301 to use the LTE antenna element of wireless device 302 for transmitting communications. BSC 305 may know that smart phone 302 is available based on information sent to BSC 305 from smart phones 302 and 303 notifying BSC 305 of their capabilities. BSC 303 therefore knows that smart phone 303 is EVDO only and not capable of transmitting LTE communications. Furthermore, in this example, smart phone 302 belongs to the same user as laptop 301 so the user indicated to software within smart phone 302 that smart phone 302 may be used to transmit MIMO communications from laptop 301. If the user had not done so, BSC 305 would not recognize smart phone 302 as being available.

After determining that smart phone 302 is available, BSC 305 transmits a response to laptop 301. The response indicates to laptop 301 that smart phone 302 is available and includes any necessary information that laptop 301 may require to set up a WIFI link with smart phone 302. In accordance with the response from BSC 305, laptop 301 sets up a WIFI link with smart phone 302. While FIG. 3 illustrates that this link is direct, the link could also be established through a WIFI network. Smart phone 302 may have software installed thereon that allows the LTE antenna of smart phone 302 to operate as an external MIMO antenna element for laptop 301.

Once the WIFI link is established between laptop 301 and smart phone 302, the streaming video application may begin streaming video over the MIMO LTE antenna element that is created by joining the LTE antenna elements of laptop 301 and smart phone 302. For simplicity, laptop 301 and smart phone 302 each have a single element LTE antenna in this example. Therefore, as the application generates data for transmission, laptop 301 creates an LTE signal that contains a Walsh code. This LTE signal is a MIMO signal that comprises a first portion of the communications for transmittal over one LTE antenna element and a second portion of the communications for transmittal over another.

After the signal is created, the first portion of the LTE signal is transferred from the LTE antenna element of laptop 301 over link 311. The second portion of the LTE signal is encapsulated in the WIFI protocol and transferred to smart phone 302 over link 313 of the established WIFI connection. Smart phone 302 receives the second portion of the LTE signal, unpacks the second portion of the LTE signal, and transfers the second portion of the LTE signal from the LTE antenna element of smart phone 302 over link 312.

The signals containing both the first portion of the data and the second portion of the data are received at base station 304. Base station 304 is able to recognize the signals as being part of the same MIMO LTE transmission based on the Wash code used to encode the two signals. This effectively means that base station 304 recognizes the signals on links 311 and 312 as being a single MIMO LTE signal over a single path indistinguishable from a path that would be used if a single MIMO LTE transmitter sent the two signals. Base station 304 therefore combines the signals to recover the full communications sent from the streaming video application on laptop 301 and transfers them on to destination 306. Destination 306 may be any system or multiple systems capable of receiving and/or displaying the streaming video.

As the MIMO LTE communications are being transmitted, BSC 305 determines that the first portion of the MIMO LTE signal that is transmitted from laptop 301 should be delayed based on a time offset between the signals from laptop 301 and smart phone 302. This determination may also be made in base station 304 itself. For example, BSC 305 determines that the signal from smart phone 302 is one half second behind that of laptop 301. This discrepancy may be due to the extra processing and WIFI transmission required to send the second portion of the signal to smart phone 302. A delay may be necessary because a time offset that is too large may affect the ability of base station 304 to combine the received signals into the communications that were generated by the streaming video application.

If BSC 305 determines that a delay is necessary, then BSC 305 transfers a feedback message to laptop 301 that indicates the delay that the laptop 301 should use when sending the first portion of the MIMO LTE signal. In response to the feedback message, laptop 301 implements the delay so that, as the video stream communications continue, the two signal portions arrive at base station 304 with less of a time differential.

Figure 5:
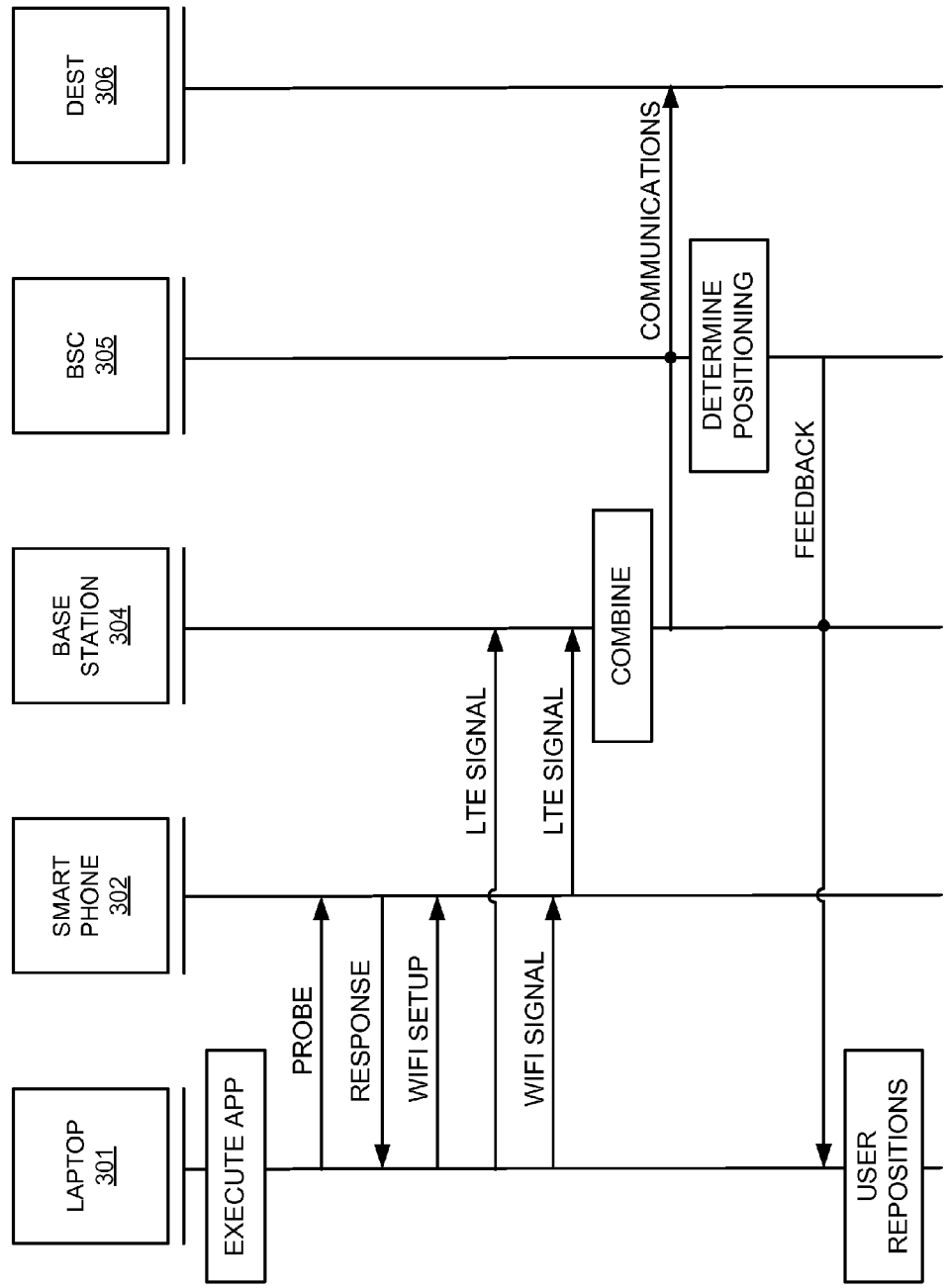
FIG. 5 illustrates the operation of the wireless communication system for improving reverse link throughput using MIMO across multiple wireless devices.

FIG. 5 is a sequence diagram illustrating the operation of wireless communication system 300 for improving reverse link throughput using Multiple Input Multiple Output (MIMO) across multiple wireless devices. The sequence begins when laptop 301 receives a user instruction to execute a file transfer application that is capable of transmitting MIMO communications over LTE. Transferring file data from the application can be achieved using only the LTE antenna element of laptop 301 but using another antenna element to transmit MIMO LTE will allow the file transfer application more transmit bandwidth for transferring files faster.

In order to transmit MIMO communications, laptop 301 transmits a probe signal over a WIFI interface of laptop 301. The probe queries other WIFI devices within range of the WIFI signal as to whether those devices are available for use as an external MIMO antenna element. Smart phones 302 and 303 are both in range but only smart phone 302 is available for laptop 301 to use the LTE antenna element of wireless device 302 for transmitting communications.

Smart phone 302 therefore transmits a response to laptop 301 over WIFI link 313. The response indicates to laptop 301 that smart phone 302 is available and includes any necessary information that laptop 301 may require to set up a WIFI link with smart phone 302. In accordance with the response from smart phone 302, laptop 301 sets up a WIFI link with smart phone 302. While FIG. 3 illustrates that this link is direct, the link could also be established through a WIFI network. Smart phone 302 may have software installed thereon that allows the LTE antenna of smart phone 302 to operate as an external MIMO antenna element for laptop 301.

Once the WIFI link is established between laptop 301 and smart phone 302, the file transfer application may begin transferring a file over the MIMO LTE antenna element that is created by joining the LTE antenna elements of laptop 301 and smart phone 302. For simplicity, laptop 301 and smart phone 302 each have a single element LTE antenna in this example. Therefore, as the application generates data for transmission, laptop 301 creates an LTE signal that contains a Walsh code. This LTE signal is a MIMO signal that comprises a first portion of the communications for transmittal over one LTE antenna element and a second portion of the communications for transmittal over another.

After the signal is created, the first portion of the LTE signal is transferred from the LTE antenna element of laptop 301 over link 311. The second portion of the LTE signal is encapsulated in the WIFI protocol and transferred to smart phone 302 over link 313 of the established WIFI connection. Smart phone 302 receives the second portion of the LTE signal, unpacks the second portion of the LTE signal, and transfers the second portion of the LTE signal from the LTE antenna element of smart phone 302 over link 312.

The signals containing both the first portion of the data and the second portion of the data are received at base station 304. Base station 304 is able to recognize the signals as being part of the same MIMO LTE transmission based on the Wash code used to encode the two signals. This effectively means that base station 304 recognizes the signals on links 311 and 312 as being a single MIMO LTE signal over a single path indistinguishable from a path that would be used if a single MIMO LTE transmitter sent the two signals. Base station 304 therefore combines the signals to recover the full communications sent from the streaming video application on laptop 301 and transfers them on to destination 306. Destination 306 may be any system or multiple systems capable of receiving and/or storing the sent file.

As the MIMO LTE communications are being transmitted, BSC 305 determines that the positioning of laptop 301 should be modified so that the portions of the MIMO LTE signals transmitted from each can be better processed at base station 304. This determination may also be made in base station 304 itself. For example, BSC 305 determines that the MIMO LTE signal would be better if laptop 301 and smart phone 302 were place five feet apart.

If BSC 305 determines that a repositioning is necessary, then BSC 305 transfers a feedback message to laptop 301 that indicates that laptop 301 and smart phone 302 should be placed a distance of two feet apart. The feedback is presented to the user so as the user may reposition laptop 301 and smart phone 302 in accordance with the feedback message. The file transfer application continues to transfer file data with laptop 301 and smart phone 302 repositioned.

Figure 6:
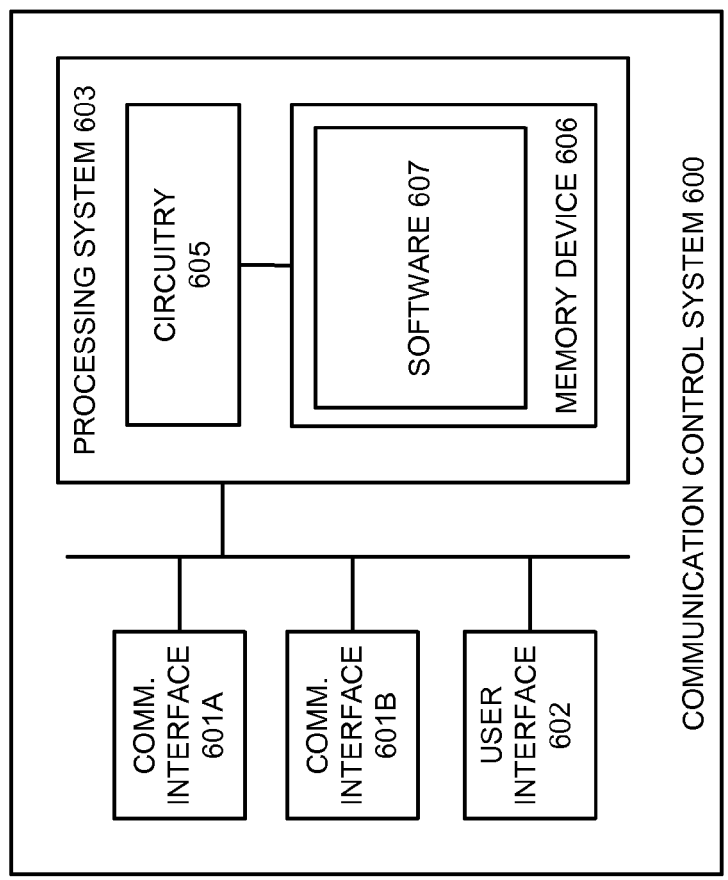
FIG. 6 illustrates a wireless communication device for improving reverse link throughput using MIMO across multiple wireless devices.

FIG. 6 illustrates wireless communication device 600. Wireless communication device 600 is an example of wireless communication device 101, although device 101 could use alternative configurations. Wireless communication device 600 comprises wireless communication interface 601, user interface 602, and processing system 603. Processing system 603 is linked to wireless communication interface 601 and user interface 602. Processing system 603 includes processing circuitry 605 and memory device 606 that stores operating software 607. Wireless communication device 600 may include other well-known components such as a battery and enclosure that are not shown for clarity. Wireless communication device 600 may be a telephone, computer, e-book, mobile Internet appliance, media player, game console, wireless network interface card, or some other wireless communication apparatus—including combinations thereof.

Wireless communication interfaces 601A and 601B each comprises RF communication circuitry and an antenna. In particular, wireless communication interface 601A includes an internal MIMO antenna element. The RF communication circuitry typically includes an amplifier, filter, RF modulator, and signal processing circuitry. Wireless communication interface 601 may also include a memory device, software, processing circuitry, or some other communication device. Wireless communication interface 601A may use various MIMO protocols, such as Worldwide Interoperability for Microwave Access (WIMAX) and Long Term Evolution (LTE) among others. Wireless communication interface 601B may use various other protocols that do not interfere with the wireless protocol of wireless communication interface 601A, such as CDMA, EVDO, GSM, WIFI, Bluetooth, HSPA, or some other wireless communication format.

In response a user instruction to execute an application associated with a wireless protocol over a Multiple Input Multiple Output (MIMO) transmit antenna system, either wireless communication interface 601A or 601B is configured to transfer a wireless probe signal to identify whether an external MIMO antenna element is available over another wireless protocol that does not interfere with the wireless protocol and receive a wireless response signal indicating an availability of the external MIMO antenna element over the other wireless protocol.

Wireless communication interface 601A is further configured to generate a signal with a Walsh code for the application and wirelessly transmitting at least a first portion of the signal with the Walsh code from an internal MIMO antenna element for receipt by a MIMO receive antenna system.

Wireless communication interface 601B is further configured to wirelessly transmit at least a second portion of the signal with the Walsh code over the other wireless protocol, wherein a second wireless communication device including the external MIMO antenna element receives at least the second portion of the signal with the Walsh code over the other wireless protocol and wirelessly transmits at least the second portion of the signal with the Walsh code from the external MIMO antenna element for receipt by the MIMO receive antenna system.

User interface 602 comprises components that interact with a user to receive user inputs and to present media and/or information. User interface 602 may include a speaker, microphone, buttons, lights, display screen, touch screen, touch pad, scroll wheel, communication port, or some other user input/output apparatus—including combinations thereof. User interface 602 may omitted in some examples.

Processing circuitry 605 comprises microprocessor and other circuitry that retrieves and executes operating software 607 from memory device 606. Memory device 606 comprises a non-transitory storage medium, such as a disk drive, flash drive, data storage circuitry, or some other memory apparatus. Processing circuitry 605 is typically mounted on a circuit board that may also hold memory device 606 and portions of communication interface 601 and user interface 602. Operating software 607 comprises computer programs, firmware, or some other form of machine-readable processing instructions. Operating software 607 may include an operating system, utilities, drivers, network interfaces, applications, or some other type of software. When executed by processing circuitry 605, operating software 607 directs processing system 603 to operate wireless communication device 600 as described herein.

In particular, operating software 607 directs processing system 603 receiving a user instruction to execute the application software associated with the wireless protocol over a Multiple Input Multiple Output (MIMO) transmit antenna system.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication system comprising:
   in a first wireless communication device, receiving a user instruction to execute an application associated with a wireless protocol over a Multiple Input Multiple Output (MIMO) transmit antenna system;
   in a first wireless communication device, in response the user instruction, transferring a wireless probe signal to identify whether an external MIMO antenna element is available over another wireless protocol that does not interfere with the wireless protocol;
   in the first wireless communication device, receiving a wireless response signal indicating an availability of the external MIMO antenna element over the other wireless protocol;
   in the first wireless communication device, generating a signal with a Walsh code for the application and wirelessly transmitting at least a first portion of the signal with the Walsh code from an internal MIMO antenna element for receipt by a MIMO receive antenna system;
   in the first wireless communication device, wirelessly transmitting at least a second portion of the signal with the Walsh code over the other wireless protocol, wherein a second wireless communication device including the external MIMO antenna element receives at least the second portion of the signal with the Walsh code over the other wireless protocol and wirelessly transmits at least the second portion of the signal with the Walsh code from the external MIMO antenna element for receipt by the MIMO receive antenna system.

2. The method of claim 1, further comprising:
   in the first wireless communication device, receiving a wireless feedback message indicating a delay for the transmission of at least the first portion of the signal with the Walsh code from the internal MIMO antenna element and delaying the transmittal of at least the first portion of the signal with the Walsh code from the internal MIMO antenna element based on the indicated delay.

3. The method of claim 2, further comprising:
   in a wireless communication network associated with the MIMO receive antenna system, receiving at least the first portion of the signal with the Walsh code transferred from the internal MIMO antenna element and at least the second portion of the signal with the Walsh code from the external MIMO antenna element, determining the delay based on a time differential between the receipt of at least the first portion of the signal with the Walsh code from the internal MIMO antenna element and at least the second portion of the signal with the Walsh code from the external MIMO antenna element, and transmitting the wireless feedback message indicating the delay.

4. The method of claim 1, further comprising:
   in the first wireless communication device, receiving a wireless feedback message indicating that at least one of the first wireless communication device and the second wireless communication device should move positions.

5. The method of claim 4, further comprising:
   in a wireless communication network associated with the MIMO receive antenna system, receiving at least the first portion of the signal with the Walsh code transferred from the internal MIMO antenna element and at least the second portion of the signal with the Walsh code from the external MIMO antenna element, determining whether the at least one of the first wireless communication device and the second wireless communication device should move positions, and transmitting the wireless feedback message indicating that the at least one of the first wireless communication device and the second wireless communication device should move positions.

6. The method of claim 4, wherein the feedback message indicates that the first wireless communication device and the second wireless communication device should be moved to positions that provide an indicated distance of separation between the first wireless communication device and the second wireless communication device.

7. The method of claim 4, wherein the feedback message indicates that an orientation of the internal MIMO antenna element relative to the external MIMO antenna element.

8. The method of claim 4, wherein the feedback message comprises a Short Message Service (SMS) message.

9. The method of claim 1, wherein the wireless protocol is a Code Division Multiplex (CDM) protocol.

10. The method of claim 9, the CDM protocol is a Long Term Evolution (LTE) protocol and wherein the other wireless protocol comprises Wireless Fidelity (WIFI).

11. A wireless communication system comprising:
a processing system configured to receive a user instruction to execute an application associated with a wireless protocol over a Multiple Input Multiple Output (MIMO) transmit antenna system;
a wireless communication interface configured to, in response the user instruction, transfer a wireless probe signal to identify whether an external MIMO antenna element is available over another wireless protocol that does not interfere with the wireless protocol and receiving a wireless response signal indicating an availability of the external MIMO antenna element over the other wireless protocol;
the processing system further configured to generate a signal with a Walsh code for the application;
an internal MIMO antenna interface configured to wirelessly transmit at least a first portion of the signal with the Walsh code from an internal MIMO antenna element for receipt by a MIMO receive antenna system;
the wireless communication interface configured to wirelessly transmit at least a second portion of the signal with the Walsh code over the other wireless protocol, wherein a second wireless communication device including the external MIMO antenna element receives at least the second portion of the signal with the Walsh code over the other wireless protocol and wirelessly transmits at least the second portion of the signal with the Walsh code from the external MIMO antenna element for receipt by the MIMO receive antenna system.

12. The wireless communication system of claim 11, further comprising:
the wireless communication interface configured to receive a wireless feedback message indicating a delay for the transmission of at least the first portion of the signal with the Walsh code from the internal MIMO antenna element; and
the internal MIMO antenna interface configured to delay the transmittal of at least the first portion of the signal with the Walsh code from the internal MIMO antenna element based on the indicated delay.

13. The wireless communication system of claim 12, further comprising:
a wireless communication network associated with the MIMO receive antenna system configured to receive at least the first portion of the signal with the Walsh code transferred from the internal MIMO antenna element and at least the second portion of the signal with the Walsh code from the external MIMO antenna element, determine the delay based on a time differential between the receipt of at least the first portion of the signal with the Walsh code from the internal MIMO antenna element and at least the second portion of the signal with the Walsh code from the external MIMO antenna element, and transmit the wireless feedback message indicating the delay.

14. The wireless communication system of claim 11, further comprising:
the internal MIMO antenna interface configured to receive a wireless feedback message indicating that at least one of the first wireless communication device and the second wireless communication device should move positions.

15. The wireless communication system of claim 14, further comprising:
a wireless communication network associated with the MIMO receive antenna system configured to receive at least the first portion of the signal with the Walsh code transferred from the internal MIMO antenna element and at least the second portion of the signal with the Walsh code from the external MIMO antenna element, determine whether the at least one of the first wireless communication device and the second wireless communication device should move positions, and transmit the wireless feedback message indicating that the at least one of the first wireless communication device and the second wireless communication device should move positions.

16. The wireless communication system of claim 14, wherein the feedback message indicates that the first wireless communication device and the second wireless communication device should be moved to positions that provide an indicated distance of separation between the first wireless communication device and the second wireless communication device.

17. The wireless communication system of claim 14, wherein the feedback message indicates that an orientation of the internal MIMO antenna element relative to the external MIMO antenna element.

18. The wireless communication system of claim 14, wherein the feedback message comprises a Short Message Service (SMS) message.

19. The wireless communication system of claim 11, wherein the wireless protocol is a Code Division Multiplex (CDM) protocol.

20. The wireless communication system of claim 19, the CDM protocol is a Long Term Evolution (LTE) protocol and wherein the other wireless protocol comprises Wireless Fidelity (WIFI).

* * * * *